(No Model.)
J. M. SMITH.
LATHE TOOL HOLDER.
No. 310,739. Patented Jan. 13, 1885.
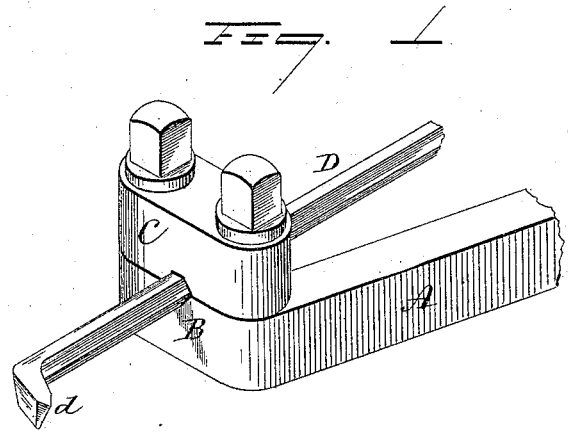
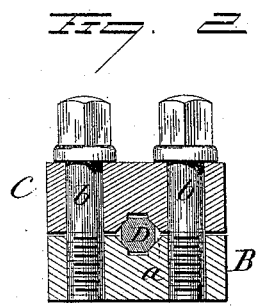

UNITED STATES PATENT OFFICE.

JAMES M. SMITH, OF SEYMOUR, CONNECTICUT.

LATHE-TOOL HOLDER.

SPECIFICATION forming part of Letters Patent No. 310,739, dated January 13, 1885.

Application filed October 20, 1884. (No model.)

*To all whom it may concern:*

Be it known that I, JAMES M. SMITH, of Seymour, in the county of New Haven, State of Connecticut, have invented a new Improvement in Lathe-Tool Holders; and I do hereby declare the following, when taken in connection with accompanying drawings, and the letters of reference marked thereon, to be a full, clear, and exact description of the same, and which said drawings constitute part of this specification, and represent, in—

Figure 1, a perspective view of the holder, showing the tool in place; Fig. 2, a section through the clamping portion of the holder.

This invention relates to an improvement in devices for holding tools in lathes for turning metal, the invention being adapted to the support of the tool for turning the inside of an article.

In the usual method of turning the inside of rings or cylinders the tool is forged from a strong bar of steel, its end drawn down to form the cutter, and then projected from the tool-stock sufficiently far to complete the internal turning before the head of the tool-stock shall reach the face of the article. This many times necessitates a very strong tool, in order that it may be properly supported, and not spring or yield under the resistance to the cut.

The object of my invention is the construction of a holder for the tool, which may be introduced into the tool-stock in the manner of the usual turning-tool, but so that the tool may project but a short distance from the holder, thereby enabling the tool to be made from a straight uniform bar of steel, and very much lighter than can be employed under the usual formation of the cutter.

It consists in a shank fitted for introduction into the tool-stock, its outer end turned at nearly right angles to the shank, combined with a clamp corresponding to the bent end, the said bent end and clamping-piece together forming the cutter-head, and having a V-shaped recess in their adjacent faces, with a set-screw at each side of said recess, whereby the tool may be introduced into the said recesses and securely clamped in place, as more fully hereinafter described.

A represents the shank, which is of a size corresponding to the opening in the tool-stock to receive the tool, and is introduced into the tool-stock and secured in the usual manner of securing a tool. The outer end of the shank is turned to one side, forming a part, B, of the head of the holder.

C is a second part of the head, corresponding to the part B.

In the adjacent faces of the parts B and C a V-shaped recess, $a$, is made transversely across the two parts, and each side the recess a clamping-screw, $b$, is introduced, loose through the one part and tapped into the other part, as seen in Fig. 2, and so that the two screws, being turned inward, will draw the two parts forcibly toward each other, or in the opposite direction will permit their separation. This completes the holder.

The tool is best made from an octagonal or polygonal shaped bar of steel, D, and so as to set into the recesses in the parts of the head, as seen in Fig. 1, and so that when so placed the two parts B C may be drawn forcibly toward each other to clamp upon the bar, as seen in Fig. 2, and securely hold it in place. The outer or working end of the tool-bar is bent and ground to shape, as at $d$. Thus arranged, the holder is fixed in the tool-stock so as to bring the cutter into the proper relation to the work to be performed, and so that the head or outer end of the holder may enter the interior of the thing to be worked upon; hence the cutter need project but a short distance from the head and be firmly supported. When the holder is once set, the tool is located by the head, and if the cutter requires to be sharpened it is only necessary to loosen the clamp upon the cutter, remove the cutter, and then, after sharpening, replace it, and as this is done without changing the position of the holder in the tool-stock it follows that in replacing the cutter it will resume its former position, the V-shaped recesses insuring such position.

This holder is made as an article of manufacture, and of different sizes, according to the different size of the tool-bars required, or of the work to be performed. One holder, in consequence of the V-shaped recesses, is, however, adapted to various-sized bars.

I claim—

As an article of manufacture, the hereindescribed lathe-tool holder, consisting of the shank A, having its end turned to one side to form the part B of the head, combined with the second part, C, of the head, corresponding to the part B, the said two parts B and C having a V-shaped recess transversely across their adjacent faces, and the screws b b, loose through one of the parts and tapped into the other part, substantially as described, the said holder adapted to receive and support a polygonal-shaped tool.

JAMES M. SMITH.

Witnesses:
 GUSTAV J. FABER,
 S. R. BUTLER.